(12) United States Patent
Matsui

(10) Patent No.: US 7,674,044 B2
(45) Date of Patent: Mar. 9, 2010

(54) SEALING DEVICE

(75) Inventor: Hiroki Matsui, Fukushima (JP)

(73) Assignee: NOK Corporation, Tokyo (JP)

( * ) Notice: Subject to any disclaimer, the term of this patent is extended or adjusted under 35 U.S.C. 154(b) by 340 days.

(21) Appl. No.: 11/629,108

(22) PCT Filed: Apr. 14, 2005

(86) PCT No.: PCT/JP2005/007207

§ 371 (c)(1),
(2), (4) Date: Dec. 11, 2006

(87) PCT Pub. No.: WO2005/121614

PCT Pub. Date: Dec. 22, 2005

(65) Prior Publication Data

US 2008/0292231 A1 Nov. 27, 2008

(30) Foreign Application Priority Data

Jun. 11, 2004 (JP) .............................. 2004-173413

(51) Int. Cl.
*F16C 33/76* (2006.01)
*F16C 33/80* (2006.01)
(52) U.S. Cl. ...................................... 384/486; 384/480
(58) Field of Classification Search ......... 384/484–486, 384/480, 544, 589
See application file for complete search history.

(56) References Cited

U.S. PATENT DOCUMENTS 5,201,529 A * 4/1993 Heinzen ...................... 277/351
5,803,617 A 9/1998 Ohnuki et al. .............. 384/486
5,813,675 A * 9/1998 Otto ........................... 277/549
5,852,361 A * 12/1998 Ouchi et al. ................. 324/174
2007/0076994 A1* 4/2007 Norimatsu et al. .......... 384/486

FOREIGN PATENT DOCUMENTS

| EP | 286151 A2 * | 10/1988 |
|---|---|---|
| GB | 2310467 | 8/1997 |
| JP | 61-112119 | 7/1986 |
| JP | 06-064508 | 3/1994 |
| JP | 09/287619 | 11/1997 |
| JP | 2001-165179 | 6/2001 |
| JP | 2002-139058 | 5/2002 |
| JP | 2003-254442 | 9/2003 |

* cited by examiner

*Primary Examiner*—Thomas R Hannon
(74) *Attorney, Agent, or Firm*—Jacobson Holman PLLC

(57) ABSTRACT

In a sealing device attached to a housing and slidably brought into close contact with a mating member, the sealing device having a mounting ring fixed to the housing in accordance with metal fitting and a rubber-like elastic body, and having a side lip slidably brought into close contact with an end face portion of the mating member and provided in the rubber-like elastic body, there is provided the sealing device which inhibits a metal fitting portion from being deteriorated due to a rust generation and inhibit inhibiting the side lip from slidably wearing. For this purpose, a flange portion is provided in the mounting ring toward an outer side in a diametrical direction, and an end face portion is covered by attaching an end face seal portion constituted by a rubber-like elastic body brought into close contact with the end face portion of the housing to the flange portion.

6 Claims, 4 Drawing Sheets

SEALING DEVICE

This is a nationalization of PCT/JP2005/007207 filed Apr. 14, 2005 and published in Japanese.

BACKGROUND OF THE INVENTION

1. Field of the Invention

The present invention relates to a sealing device in accordance with a sealing technique. The sealing device in accordance with the present invention is used, for example, as a hub seal (a hub bearing seal) in a motor vehicle related field.

2. Description of the Conventional Art

There have been conventionally known a sealing device 51, for example, shown in FIG. 4. The sealing device 51 corresponds to a sealing device 51 attached to a housing 61 such as an outer race in a bearing so as to be slidably brought into close contact with a mating member 62 such as a rotation shaft, and has a mounting ring 52 fixed to a housing 61 in accordance with a metal fitting, a rubber-like elastic body 53 attached to the mounting ring 52, and a side lip 53a slidably brought into close contact with an end face portion 62a of the mating member 62 and provided in the rubber-like elastic body 53 (refer to Japanese Unexamined Patent Publication No. 9-287619).

However, in accordance with the conventional sealing device 51, since a seal operation is not applied at all to the end face portion 61a of the housing 61, there is a case that rust is generated in the end face portion 61a of the housing 61. The rust generated in the end face portion 61a of the housing 61 grows up to an inner peripheral surface of the housing 61, and deteriorates a metal fitting portion of the housing 61 and the mounting ring 52 so as to have an adverse effect on a sealing performance of the portion. Further, there is a case that the rust generated in the end face portion 61a of the housing 61 transfers to the end face portion 62a of the adjacently facing mating member 62. In this case, an abrasion of the side lip 53a makes progress so as to have an adverse effect on the sealing performance of the portion.

SUMMARY OF THE INVENTION

Problem to be Solved by the Invention

The present invention is made by taking the points mentioned above into consideration, and an object of the present invention is to provide a sealing device in which rust generation at an end face portion of a housing where the sealing device is attached can be inhibited, to prevent deterioration of a metal fitting portion due to the rust generation and prevent wearing of a side lip due to sliding.

Means for Solving the Problem

In order to achieve the object mentioned above, in accordance with a first aspect of the present invention, there is provided a sealing device attached to a housing such as an outer race in a bearing and slidably brought into close contact with a mating member such as a rotation shaft, comprising:

a mounting ring fixed to the housing in accordance with a metal fitting;

a rubber-like elastic body attached to the mounting ring; and a side lip slidably brought into close contact with an end face portion of the mating member and provided in the rubber-like elastic body, wherein the sealing device further comprises:

a flange portion provided in the mounting ring toward an outer side in a diametrical direction; and an end face seal portion constituted by a rubber-like elastic body, attached to the flange portion and brought into close contact with an end face portion of the housing.

Further, in accordance with a second aspect of the present invention, there is provided a sealing device as recited in the first aspect mentioned above, wherein the end face seal portion constituted by the rubber-like elastic body is provided with a bead-like projection brought into close contact with the end face portion of the housing.

Further, in accordance with a third aspect of the present invention, there is provided a sealing device as recited in the first or second aspect mentioned above, wherein the end face seal portion constituted by the rubber-like elastic body is provided with an outer peripheral side lip positioned at an outer periphery of the side lip and slidably brought into close contact with the end face portion of the mating member.

Further, in accordance with a fourth aspect of the present invention, there is provided a sealing device as recited in the first or second aspect mentioned above, wherein the end face seal portion constituted by the rubber-like elastic body is provided with a labyrinth seal positioned at an outer periphery of the side lip and forming a small gap with respect to the end face portion of the mating member so as to achieve a seal operation.

Effect of the Invention

The present invention achieves the following effect.

In the sealing device in accordance with the first aspect of the present invention provided with the structure mentioned above, since the flange portion is provided in the mounting ring toward the outer side in the diametrical direction, and the end face seal portion constituted by the rubber-like elastic body and brought into close contact with the end face portion of the housing is attached to the flange portion, it is possible to shield the end face portion of the housing from an external ambient atmosphere by the end face seal portion constituted by the rubber-like elastic body, and it is possible to cover the end face portion, whereby it is possible to effectively inhibit rust generation at the end face portion. Therefore, in accordance with an intended purpose, it is possible to effectively inhibit deterioration of the metal fitting portion due to the rust generation in the end face portion of the housing and inhibit wearing of the side lip due to sliding.

Further, in addition to this, in the sealing device in accordance with the second aspect of the present invention, since the end face seal portion constituted by the rubber-like elastic body is provided with the bead-like projection brought into close contact with the end face portion of the housing, it is possible to increase the seal performance of the end face seal portion by the bead-like projection, and it is possible to effectively inhibit intrusion of muddy water toward the metal fitting portion.

Further, in the sealing device in accordance with the third aspect of the present invention, since the end face seal portion constituted by the rubber-like elastic body is provided with the outer peripheral side lip positioned at the outer periphery of the side lip and slidably brought into close contact with the end face portion of the mating member, it is possible to increase a sealing performance between the end face seal portion and the end face portion of the mating member by the outer peripheral side lip, and it is possible to effectively inhibit intrusion of a lot of muddy water and dusts toward the side lip. Further, when the outer peripheral side lip is provided at the outer peripheral portion of the sealing device as mentioned above, it is possible to expect a rust proofing effect of the seal surface existing in an inner peripheral side thereof.

Further, in the sealing device in accordance with the fourth aspect of the present invention, since the end face seal portion constituted by the rubber-like elastic body is provided with the labyrinth seal positioned at the outer periphery of the side lip and forming the small gap with respect to the end face portion of the mating member so as to achieve the seal operation, it is possible to increase the seal performance between the end face seal portion and the end face portion of the mating member by the labyrinth seal, and it is possible to effectively inhibit intrusion of a lot of muddy water and dusts toward the side lip. Further, when the labyrinth seal is provided at the outer peripheral portion of the sealing device, it is possible to expect a rust proofing effect of the seal surface existing the inner peripheral side thereof.

Figure 1:
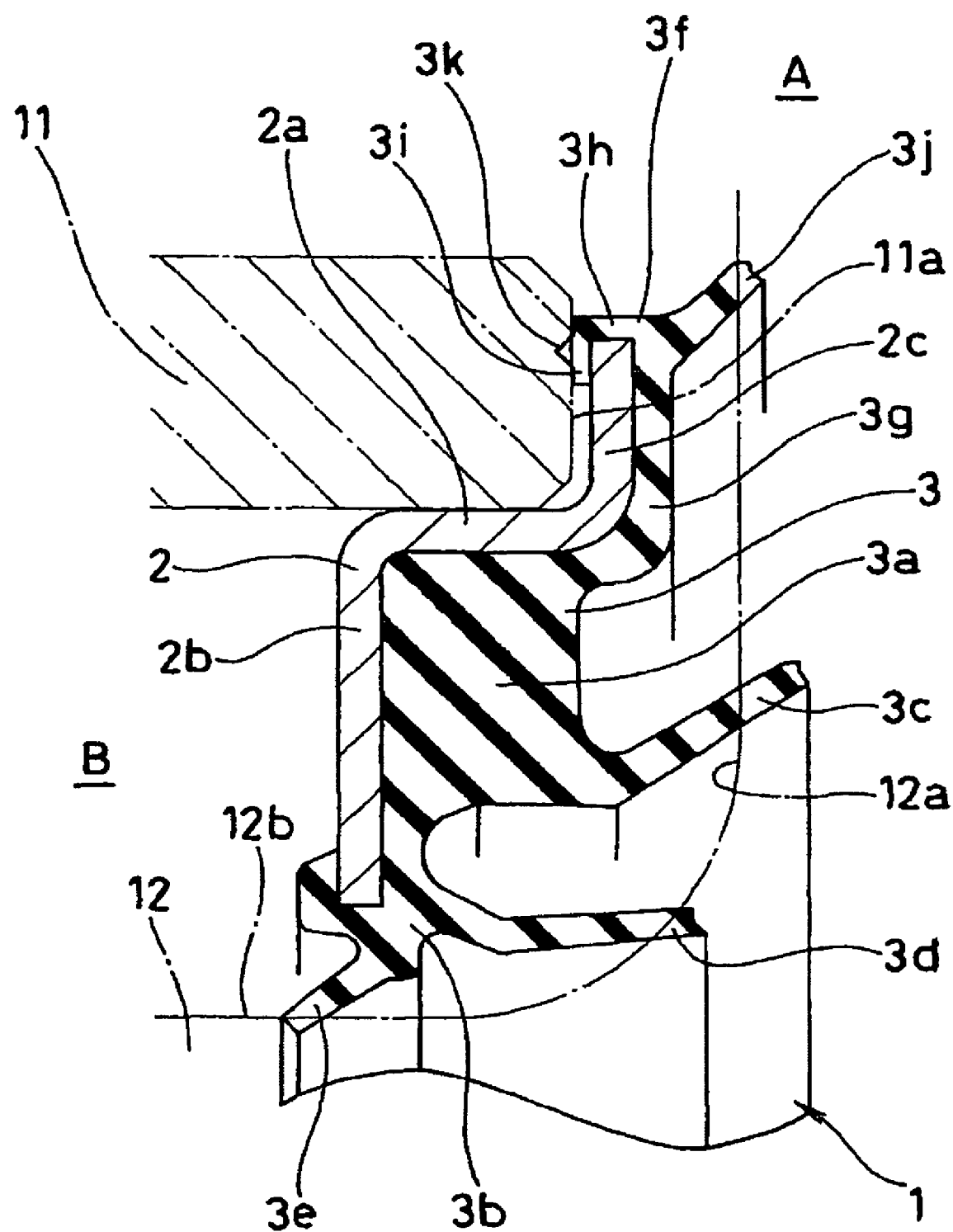
FIG. 1 A cross sectional view of a main portion of a sealing device in accordance with a first embodiment of the present invention.

DESCRIPTION OF REFERENCE NUMERALS 1 sealing device
2 mounting ring
2a tubular portion
2b, 2c flange portion
3 rubber-like elastic body
3a, 3b, 3g, 3h, 3i annular portion
3c, 3d side lip
3e radial lip
3f end face seal portion
3j outer peripheral side lip
3k bead-like projection
3m projection or groove
4 labyrinth seal
5 small gap
11 outer race (housing)
11a, 12a end face portion
12 rotation shaft (mating member)
12b peripheral surface portion
A bearing outer portion
B bearing inner portion

DETAILED DESCRIPTION OF PREFERRED EMBODIMENT

The present application includes the following modes.

Since an end face portion of a mating shaft and a surface of a housing (an outer race) are both constituted by a metal face, there is a possibility that a rust generation is promoted such that a rust generated in one side transfers to an opposite surface or the like. Accordingly, if a seal is formed as a flange type so as to cover a housing surface by rubber, it is possible to slow down the rust progress, and it is possible to improve a seal service life. As a seal shape, a flange portion around which rubber is attached, is provided at an outer periphery of a conventional type seal. A fitting portion to the housing is formed by metal fitting, and a rubber projection is provided on a housing contact surface of the flange portion, thereby achieving a shape for preventing intrusion of muddy water from an outer periphery of the seal. Further, in order to improve muddy water resistance characteristic, a lip may be provided in the mating shaft side of the flange portion. In accordance with the structure mentioned above, the seal service life is improved by slowing down the rust progress. Further, if the lip is provided in the flange portion, it is possible to expect an improvement of muddy water resistance and dust resistance.

Embodiments

Next, a description will be given of embodiments in accordance with the present invention with reference to the accompanying drawings.

First Embodiment

FIG. 1 shows a cross section of a main portion of a sealing device 1 in accordance with a first embodiment of the present invention. The sealing device 1 is used as a hub seal (a seal for a hub bearing), for example, in a bearing portion in an axle suspension apparatus for a motor vehicle, and is structured as follows.

First, there is provided a metal mounting ring 2 attached to an outer race 11 corresponding to a mounting member (a housing) in the bearing portion mentioned above, and a rubber-like elastic body 3 is bonded by vulcanization to the mounting ring 2.

The mounting ring 2 is structured such that an inward flange portion 2b is integrally formed toward an inner side in a diametrical direction at one end portion in an axial direction of a tubular portion 2a metal-fitted to an inner peripheral surface of the outer race 11, and an outward flange portion 2c is integrally formed toward an outer side in the diametrical direction at another end portion in the axial direction of the tubular portion 2a. The latter outward flange portion 2c is arranged so as to face to an end face portion 11a in the axial direction of the outer race 11 in the axial direction.

The rubber-like elastic body 3 has a first annular portion 3a arranged at an inner peripheral side of the tubular portion 2a of the mounting ring 2 and at another end side in an axial direction of the inward flange portion 2b, and a second annular portion 3b arranged at an inner peripheral end portion of the inward flange portion 2b. A side lip 3c slidably brought into close contact with an end face portion 12a of a rotation shaft 12 is integrally formed with the former first annular portion 3a. Further, with the latter annular portion 3b, there are integrally formed an inner peripheral side lip 3d positioned at an inner periphery of the side lip 3c and slidably brought into close contact with the end face portion 12a of the rotation shaft 12, and a radial lip 3e slidably brought into close contact with a peripheral surface portion 12b of the rotation shaft 12.

Further, with the rubber-like elastic body 3, there is integrally formed an end face seal portion 3f constituted by a rubber-like elastic body bonded by vulcanization around the outward flange portion 2c and brought into close contact with the end face portion 11a of the outer race 11. In the drawing, the end face seal portion 3f integrally has a third annular portion 3g attached to an end face in another end side in the axial direction of the outward flange portion 2c, a fourth annular portion 3h attached to an outer peripheral end portion of the outward flange portion 2c, and a fifth annular portion 3i attached to an end surface in one end side in the axial direction of the outward flange portion 2c. In an outer peripheral end portion of the third annular portion 3g, there is integrally formed an outer peripheral side lip 3j positioned at an outer periphery of the side lip 3c and slidably brought into close contact with the end face portion 12a of the rotation shaft 12. Further, in an end face portion of the fifth annular portion 3i, there is integrally formed an annular bead-like projection 3k brought into close contact with the end face portion 11a of the outer race 11.

The sealing device 1 having the structure mentioned above is used as the hub seal as mentioned above, is structured such as to seal the bearing to prevent intrusion of a foreign matters such as a muddy water, a dust or the like from an outer portion A of the bearing into an inner portion B of the bearing, and has a feature in a point of achieving the following operations and effects on the basis of the structure mentioned above.

First, since the outward flange portion 2c is integrally formed in one end in the axial direction of the tubular portion 2a in the mounting ring 2 toward the outer side in the diametrical direction as mentioned above, and the end face seal portion 3f constituted by the rubber-like elastic body brought into close contact with the end face portion 11a of the outer race 11 is bonded by vulcanization to the outward flange portion 2c, it is possible to shield the end face portion 11a of the outer race 11 from the external ambient atmosphere by the end face seal portion 3f, and cover the end face portion 11a, whereby it is possible to inhibit the rust generation in the end face portion 11a. Accordingly, it is possible to inhibit deterioration of the metal fitting portion between the outer race 11 and the mounting ring 2 and inhibit wearing of the side lip 3c due to sliding, due to the rust generation in the end face portion 11a of the outer race 11.

Further, since the bead-like projection 3k brought into close contact with the end face portion 11a of the outer race 11 is provided in the end face seal portion 3f constituted by the rubber-like elastic body, it is possible to increase the sealing performance of the end face seal portion 3f by the bead-like projection 3k. Accordingly, it is possible to inhibit intrusion of muddy water into the metal fitting portion between the outer race 11 and the mounting ring 2.

Further, since the end face seal portion 3f constituted by the rubber-like elastic body is provided with the outer peripheral side lip 3j positioned at the outer periphery of the side lip 3c and slidably brought into close contact with the end face portion 12a of the rotation shaft 12, it is possible to increase the sealing performance between the end face seal portion 3f and the end face portion 12a of the rotation shaft 12 by the outer peripheral side lip 3j. Accordingly, it is possible to inhibit intrusion of a lot of muddy water and dust toward the side lip 3c. Further, since the outer peripheral side lip 3j is provided at the outermost peripheral position of the sealing device 1, it is possible to expect the rust proofing effect of the seal surface in the inner peripheral side of the side lip 3j.

Second Embodiment

Figure 2:
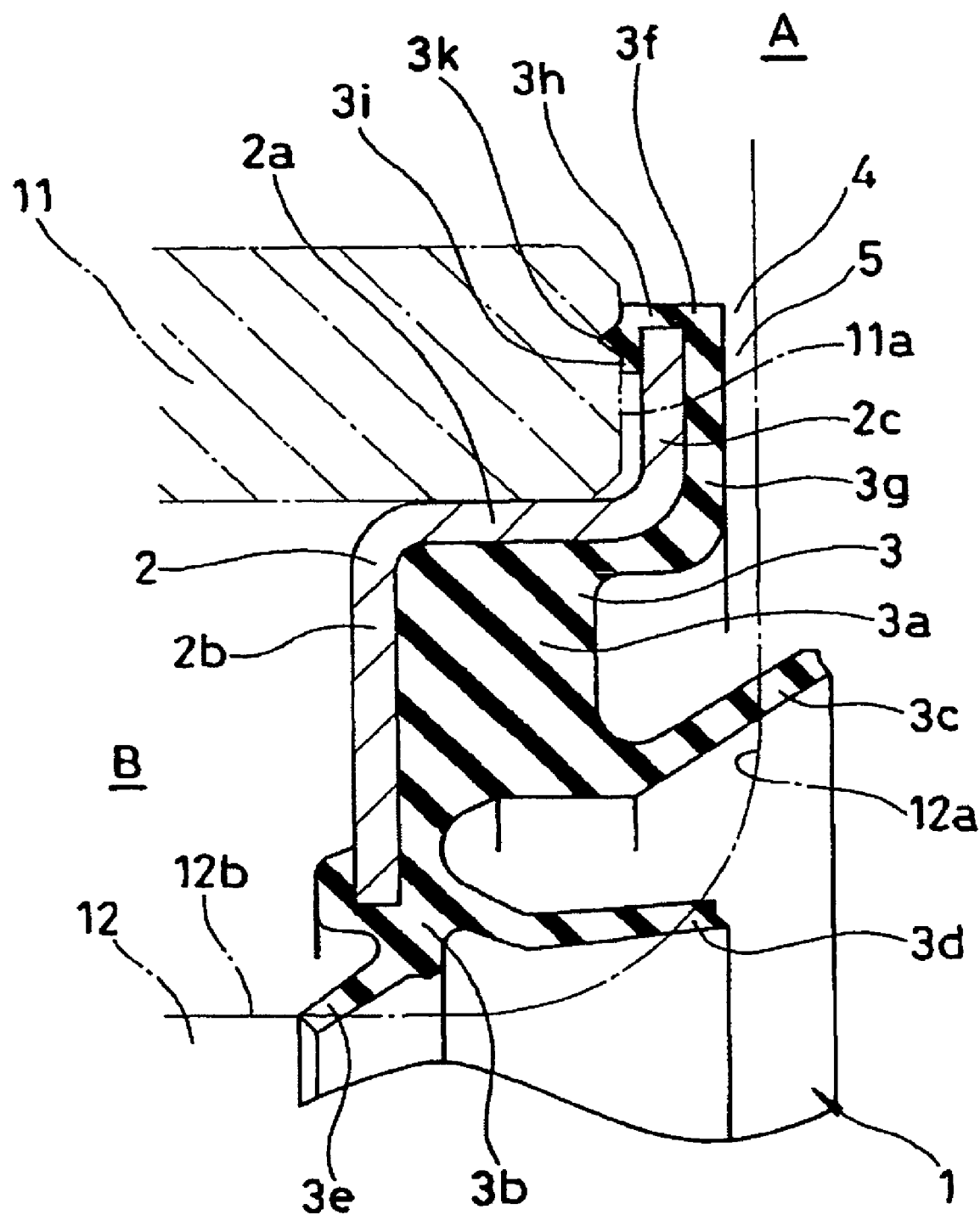
FIG. 2 A cross sectional view of a main portion of a sealing device in accordance with a second embodiment of the present invention.

In the first embodiment mentioned above, the outer peripheral side lip 3j is provided to the end face seal portion 3f constituted by the rubber-like elastic body as mentioned above, however, a labyrinth seal 4 may be provided in place of the outer peripheral side lip 3j, as shown in FIG. 2. The labyrinth seal 4 is positioned at the outer periphery of the side lip 3c and forms a small gap (an annular small gap in an axial direction) 5 with respect to the end face portion 12a of the rotation shaft 12 so as to achieve a labyrinth seal operation, and it is possible to achieve the same operations and effects as those of the outer peripheral side lip 3j.

Further, in the case that the labyrinth seal 4 is provided between the end face seal portion 3f and the rotation shaft 12 as mentioned above, it can be considered that a bead-like projection or groove is provided in the end face surface of the end face seal portion 3f facing to the end face portion 12a of the rotation shaft 12. If the projection or the groove is provided as mentioned above, it is possible to make the end face seal portion 3f closer to the end face portion 12a of the rotation shaft 12 (in the case of the projection), or it is possible to improve a sealing performance on the basis of a screw effect (in the case of the projection or the groove). FIGS. 3 and 4 show examples thereof, and are respectively structured as follows.

Figure 3A:
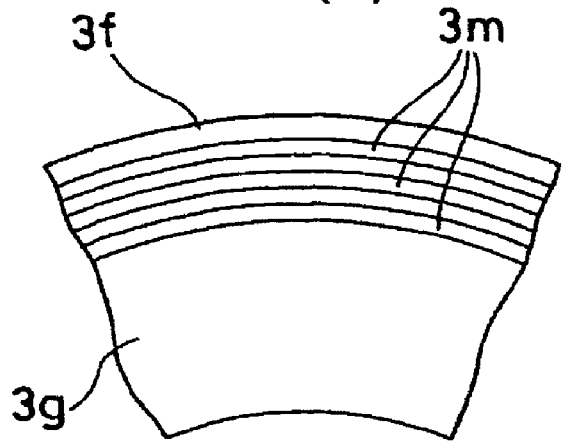
FIG. 3 (A) to (E) are explanatory views of an end face seal portion in a sealing device in accordance with another embodiment of the present invention.
Figure 3B:
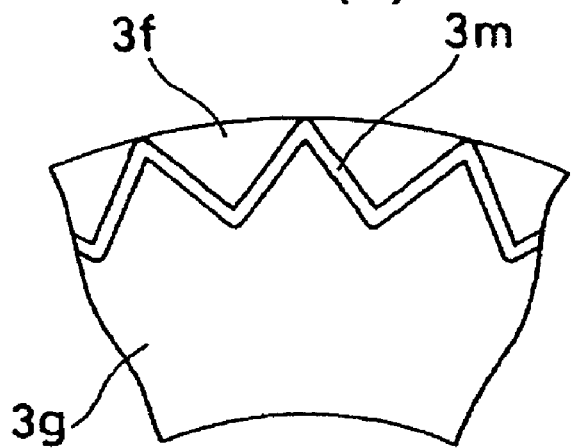
Figure 3C:
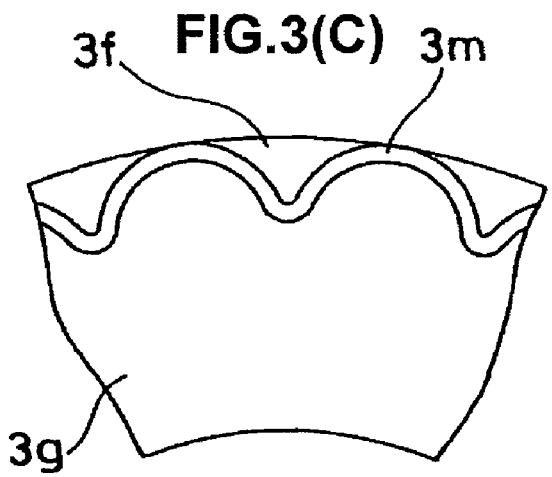
Figure 3D:
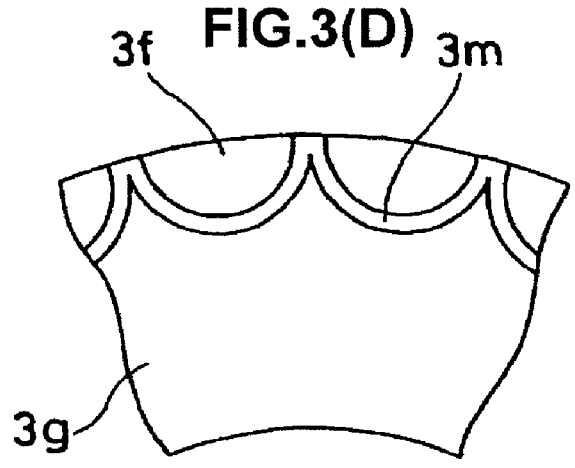
Figure 3E:
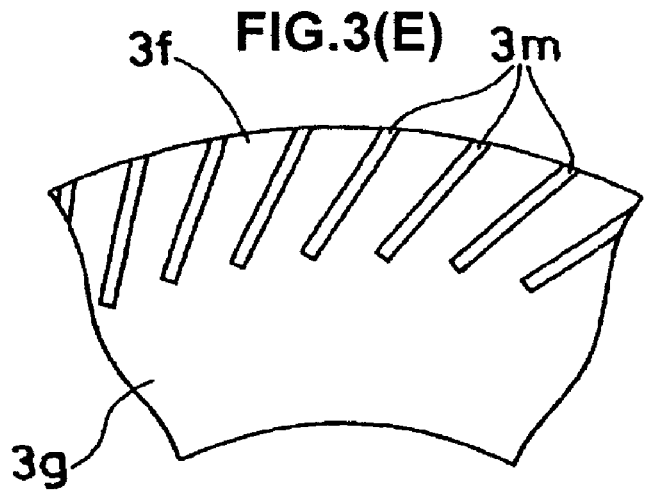
Figure 4:
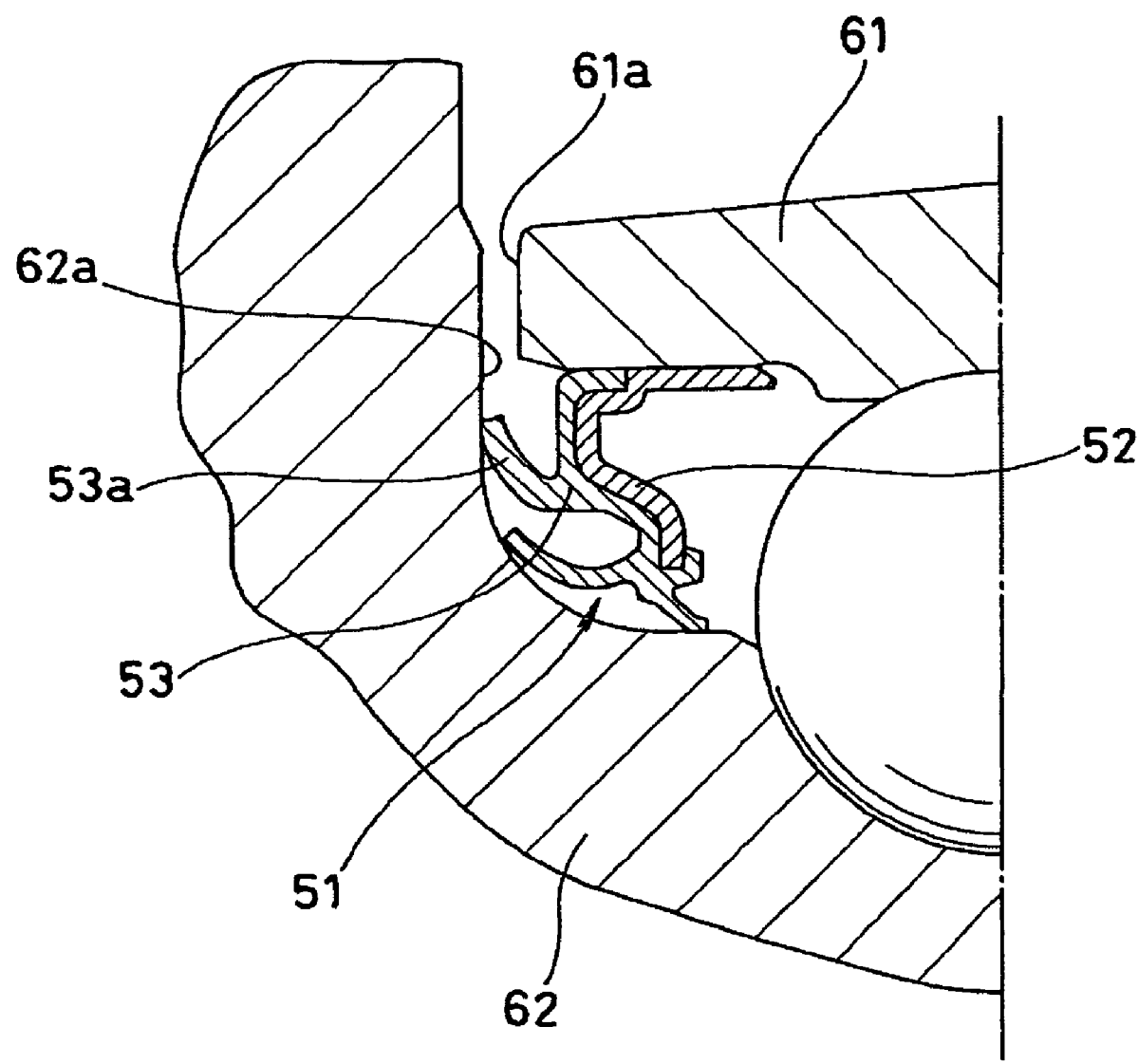
FIG. 4 A cross sectional view of a main portion of a sealing device in accordance with a prior art.

In the case of FIG. 3(A), a plurality of bead-like projections or grooves 3m are annularly provided on the end face surface of the end face seal portion 3f, and the projections or grooves are coaxially provided. In the case of FIG. 3(B), bead-like projections or grooves 3m are formed on the end face surface of the end face seal portion 3f in such a manner that a lot of V-shapes are arranged on a circumference. In the case of FIG. 3(C), bead-like projection or groove 3m are formed on the end face surface of the end face seal portion 3f in such a manner that a lot of circular arc shapes are arranged on a circumference (in which center points of the circular arcs are arranged in an inner peripheral sides of the circular arcs). In the case of FIG. 3(D), bead-like projections or grooves 3m are formed on the end face surface of the end face seal portion 3f in such a manner that a lot of circular arc shapes are arranged on a circumference (in which center points of the circular arcs are arranged in an inner peripheral sides of the circular arcs). Further, in the case of FIG. 3(E), spiral shaped bead-like projections or grooves 3m are formed on the end face surface of the end face seal portion 3f.

What is claimed is:

1. A sealing device attached to a metal outer race in a bearing portion of an axle suspension apparatus for a motor vehicle and slidably brought into close contact with a rotation shaft, said sealing device comprising:

a metal mounting ring fixed to said outer race;

a rubber-like elastic body attached to said metal mounting ring; and a side lip slidably brought into close contact with an end face portion of said rotation shaft and provided as a part of said rubber-like elastic body, the sealing device further including a flange portion of said mounting ring located toward an outer side in a diametrical direction; and an end face seal portion of said rubber-like elastic body, said end face seal portion being attached to said flange portion and brought into close contact with an end face portion of said metal outer race, the end face seal portion of the rubber-like elastic body being provided with a bead-like projection brought into close contact with the end face portion of the metal outer race, the end face seal portion of the rubber-like elastic body being provided with a labyrinth seal positioned at an outer periphery of the side lip and forming a small annular gap with respect to the end face portion of the rotation shaft so as to achieve a seal operation, the labyrinth seal including a projection or groove in an end face surface of the end face seal portion, the projection or groove facing the end face portion of the rotation shaft.

2. The sealing device as claimed in claim 1, wherein the projection or groove is spiral shaped.

3. The sealing device as claimed in claim 1, wherein the projection or groove is a series of annular projection or grooves.

4. The sealing device as claimed in claim 1, wherein the projection or groove is an undulating projection or groove.

5. The sealing device as claimed in claim 4, wherein the undulating projection or groove form straight sided V-shapes.

6. The sealing device as claimed in claim 4, wherein the undulating projection or groove is curved.

* * * * *